3,475,402
PROCESS OF EXTRACTING PROTEINS FROM MISTLE PRESS JUICE BY CARRIER-FREE ELECTROPHORESIS
Frederic Vester, Munich-Solln, Germany, assignor to Ciba Corporation, New York, N.Y., a corporation of Delaware
Filed Dec. 21, 1966, Ser. No. 603,637
Claims priority, application Switzerland, Dec. 30, 1965, 18,122/65
Int. Cl. C07g 7/00; C08h 7/00; A61k 27/14
U.S. Cl. 260—112                                          10 Claims

ABSTRACT OF THE DISCLOSURE

Process for the preparation of highly active tumour-inhibiting proteins free from ballast material and atypically toxic impurities which comprises separating a member selected from the group consisting of press juice from mistles and a purified tumour-inhibiting protein fraction obtained therefrom by a carrier-free deflection electrophoresis and isolating the tumour-inhibiting protein.

---

Figure 1:
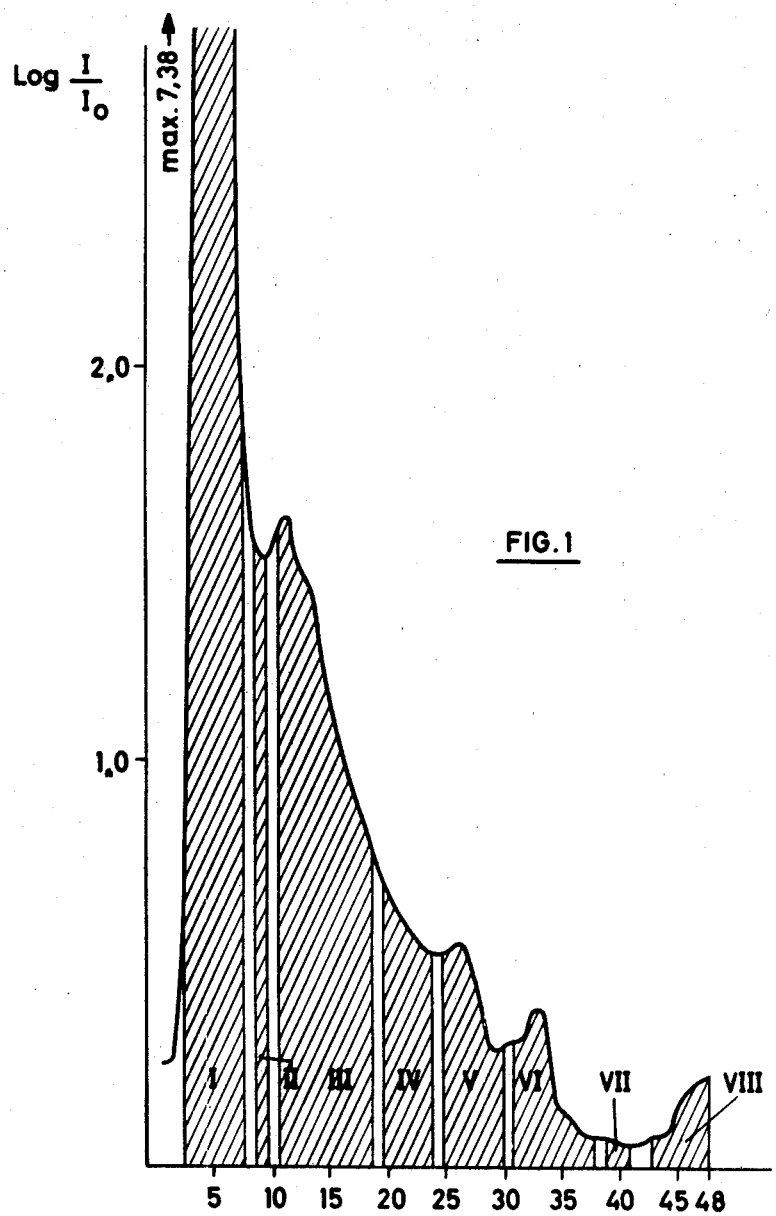

The present invention provides a process for the manufacture of a protein having a tumour inhibiting activity, in purified form, from plant material of Viscum species, especially *Viscum album* L. sensu latiore, or from Loranthus species, especially *Loranthus europaeus* L., hereinafter classified together under the short term of "mistle."

It is known that when the mistle press juice is purified, for example, by total precipitation with aqueous salt solutions, such as ammonium sulphate solutions, followed by dialysis, or with organic solvents such as acetone, proteinous fractions having tumour inhibiting properties can be enriched (cf. Selawry et al., Hoppe-Seyler's Zeitschr. Phys. Chem. 324, pages 262–281, 1961).

Furthermore, in my application No. 355,429, filed Mar. 27, 1964, now U.S. Patent No. 3,394,120, it has been shown that a purified and highly active protein can be obtained by salting out the press juice, after having freed it from sludgey impurities, i.e. the clear press juice from mistles, or equivalent aqueous extracts, dialysates or dry substances, by means of an aqueous salt solution, especially an ammonium sulphate solution, and dialyzing the protein fraction salted-out at a molarity of about 1 to 1.9 (calculated on the basis of ammonium sulphate) against water and, if desired, salting- in the water-insoluble portion of the retentate up to a molarity of at most 0.4 (calculated on the basis of ammonium sulphate) with an aqueous salt solution, especially an ammonium sulphate solution, and, if desired, purifying the resulting solution on an adsorbent, for example a polydextran gel (for example, a polydextran gel with ion-exchanging properties, especially with basic groupings, e.g. DEAE-Sephadex, a cross linkages containing polydextran gel, which contains hydroxy groups etherified with diethylaminoethyl groups and has molecular sieve and ion-exchange properties), if desired over 2 stages, for example, by filtration through a block of the adsorbent and/or chromatography through a column of the adsorbent. The precipitated protein material called Nx, or its dialysis retentate Nx 1, as well as the fractions obtained therefrom after salting-in, Nx $11_{0-0.4}$ and Nx $12_{0-0.4}$, for example Nx $11_{0.1}$, Nx $11_{0.35}$, Nx $12_{0.1}$ or Nx $12_{0.35}$, or further fractions purified, for example, on an adsorbent, such as Nx $12_{0.1}$I and Nx $12_{0.35}$I, display pronounced tomour inhibiting properties.

Moreover, it has further been shown in application No. 525,684, filed Feb. 7, 1966, by Frédéric Vester et al., that by ultracentrifugation, for example, at rotational speeds of over 20,000 revolutions per minute, that is to say in a gravity field exceeding 100,000 G, certain impurities, such as inactive protein constituents and especially atypically toxic proteinous material without antitumour activity can be specifically removed from protein fractions which, for example, have been enriched and pre-purified according to the process referred to above.

The hitherto known processes for the manufacture of highly active and pure protein fractions are cumbersome, primarily because of the fact that they require several process steps; in addition, every step must be carried out with cooling, that is to say at a temperature from about 0° to about 10° C., to prevent losses of activity. It is, therefore, obvious that considerable advantages would derive from a process in which one or several of the time-consuming purification measures, especially the filtration and chromatography, as well as the centrifugation, could be dispensed with. Apart from that, a further enrichment of the purified protein fractions is, of course, also desirable.

The present invention is based on the observation that it is possible to obtain in a simple and surprising manner a highly active tumour inhibiting protein freed from ballast matter and from atypically toxic impurities when press juice from mistles or purified tumour-inhibiting protein fractions obtained therefrom, are separated by a carrier-free deflection electrophoresis and the tumour-inhibiting protein is isolated.

It has been established that it is possible to obtain by this method in a simple, rapid and especially continuous manner the desired protein fractions. The unavoidable cooling, too, can be performed very simply in this method. Apart from being a means of circumventing conventional purification steps, carrier-free deflection electrophoresis may, of course, also be used as a purifying step in any other multi-stage enriching process.

The principle of carrier-free deflection electrophoresis is known (cf. Hannig, Z Anal. Chem., vol. 181, page 244 [1961]; Hannig, "Eine Neuentwicklung der trägerfreien Ablenkungselektrophorese und ihre Answendung auf cytologische Probleme," postgraduate thesis [Munich, 1964]).

The starting material to be used may be a mistle press juice as is obtained from plant material, especially from the stems and leaves of Viscum or Loranthus species, especially from mistles growing on deciduous trees, such as oak, apple or poplar mistles. It is, however, customary to free the press juice from sludge-like impurities, advantageously by centrifugation. If desired, further ballast material can be removed from the clear juice, or from an equivalent aqueous extract, inter allia by dialysis; alternatively, the corresponding dry substances may be used.

It is, however, preferable to perform the present process with a protein fraction obtained from the clear press juice which has been enriched by preliminary purification, that is to say primarily the fractions Nx or their dialysis retentates Nx 1 obtained by salting out, for example, with an ammonium sulphate solution at a molarity of 1 to 1.9 (calculated on the basis of ammonium sulphate); likewise suitable are the further purified fractions, obtained by salting-in, for example, with an ammonium sulphate solution at a molarity of up to 0.4 (calculated on the basis of ammonium sulphate), Nx $11_{0-0.4}$ or especially Nx $12_{0-0.4}$, such as Nx $11_{0.1}$ or Nx $11_{0.35}$, or, particularly, Nx $12_{0.1}$ or Nx$_{0.35}$, or further purified protein fractions obtained therefrom, for example, by treatment with an adsorbent, such as a polydextrane gel (e.g. DEAE-Sephadex), for example, by filtration through a block of the adsorbent, as well as by ultracentrifugation.

Since the active protein fractions are easily denatured, the electrophoresis is performed in the cold, advantageously at a temperature not above +10° C., that is to say at about 0° to 10° C. The press juice used as starting material and the protein fractions obtained from it by preliminary purification should be worked up in as fresh a state as possible, or else they should be made storable by freeze drying.

Usually, the starting material is subjected to the carrier-free deflection electrophoresis in a suitable aqueous buffer solution, containing about 0.1% to about 5%, preferably about 0.5% to about 5%, of the starting material.

Suitable buffers for the solution migrating in the deflection chamber (chamber buffers) are above all non-denaturing aqueous buffers, such as phosphate buffers, diethyl barbitruate buffers (Veronal buffers), 2-amino-2-hydroxymethyl-1,3-propanediol buffers (tris buffers) or equivalent buffer solutions, the concentration being advantageously within the molarity range from about 0.01 molar to about 0.1 molar, preferably about 0.03 molar. These buffers are adjusted to a pH value of about 4 to about 10.5, preferably by a pH value in the neighbourhood of the neutral point, that is to say to a pH from about 6 to about 9. The chamber buffer used may be, for example, an 0.03 molar aqueous 2-amino-2-hydroxymethyl-1,3-propanediol buffer (tris buffer), adjusted with citric acid to a pH value of 8.6.

As electrode buffer there is used above all the same buffer as is used as chamber buffer, but preferably at a higher molarity, for example, at 3 times the molarity, that is to say preferably in a concentration corresponding to about 0.1 molar.

The starting material is preferably used in the identical buffer or at least in an aqueous buffer solution having comparable pH and molarity values. A protein solution used for deflection electrophoresis may be prepared, for example, by salting-in the protein fraction and freeing it from any undissolved matter by centrifugation; this may be followed by a redialyzation against a suitable buffer solution, and/or by treatment with an adsorbent, for example, filtration through a polydextran block, followed, if desired, by redialysis or dialysis against water and lyophilization.

The deflection electrophoresis is usually performed by applying the starting material preferably at that side which is closer to the cathode; a uniform rate of addition, also of the buffer solution, is maintained. The electric field is kept constant between about 1,200 v. and about 2,500 v., e.g. at about 1,800 v. (for example, about 36 volts per centimetre for a chamber of 50 cm. width).

Correspondingly, the current intensity ranges from about 120 ma. to about 380 ma., preferably from about 120 ma. to about 250 ma. and depends, at a constant voltage, on the temperature, the thickness of the buffer layer, its composition and ion concentration.

The flow rate of the buffer film of about 0.5 mm. thickness ranges from about 40 ml./hour to about 200 ml./hour, and is preferably about 100 ml./hour. This corresponds to a migrating speed of the buffer front of about 15 cm./hour to about 75 cm./hour, preferably of about 35 cm./hour, for a front 50 cm. width.

The addition rate of the substance solution may be up to about 5 ml./hour, but better separation is achieved with a rate of about 1 ml./hour to about 2 ml./hour.

The progress of the carrier-free deflection electrophoresis may be observed in a variety of ways, advantageously by means of ultraviolet absorption in which, at a characteristic wave length, for example, at 280 m$\mu$, the absorption of the individual fractions obtained by the deflection electrophoresis is determined. The rise and drop in the ultraviolet absorption across the resulting fractions indicates the positions of the individual protein and absorbent ballast components, respectively among which the desired highly active protein fraction can be recognized from its position and then isolated. FIGURE 1, for example, respresents an ultraviolet absorption diagram recorded at a wave length of 280 m$\mu$ across all isolated fractions of the deflection electrophoresis. The values on the abscissa refer to the fractions, those on the ordinate to the ultraviolet absorption.

The composition of the individual, isolated fractions can be determined by usual methods, preferaby by way of electrophoresis on strips of acetylcellulose foil. This electrophoresis is carried out, for example, with the diaphragm foils marketed by Messrs. Carl Schleicher & Schuell (manufacturers: Membranfiltergesellschaft Goettingen), for example, in a specially constructed chamber made from synthetic material, under standard conditions (temperature: 22° C.; voltage: 18 v./cm.; migrating time: 2 hours; buffer: sodium diethyl barbitruate (Veronal sodium), sodium acetate and 0.1 N-hydrochloric acid with an ion concentration of 0.025 and a pH of 8.6; size of foil strips: 180 x 25 mm.; weight of coating: 60 $\gamma$).

To render the individual protein bands visible, staining is performed with amido black according to the known procedure and the dry strips thus made opaque are evaluated in the Analytrol apparatus of Messrs. Beckman to yield a proteinogram.

Figure 2:
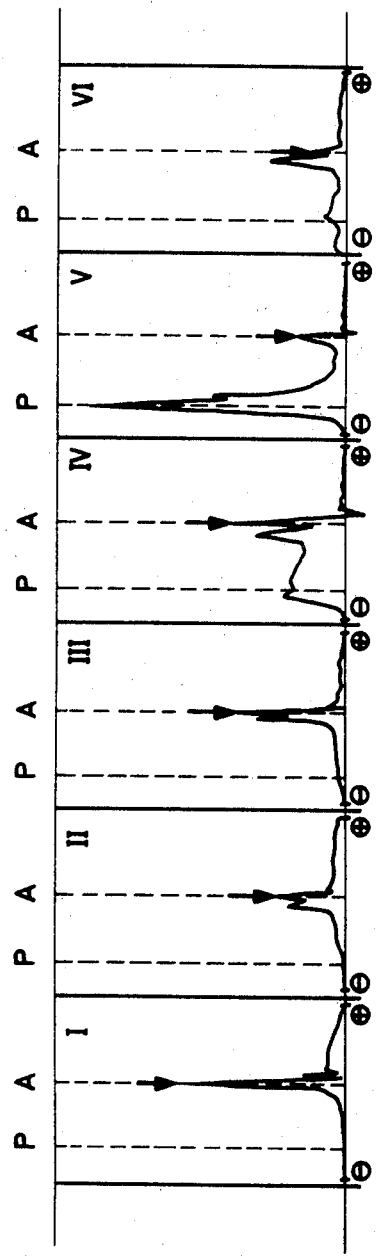

Thus, for example, the collective fractions I–VIII combined on the basis of the ultraviolet absorption of the individual fractions 1–48 (FIG. 1) resulting from the deflection elecrtophoresis of a particular protein mixture, reveal in the acetylcellulose foil electrophoresis the compositions shown in FIGURE 2; A designates the point of application and P the positions of the biologically active protein components, the extinction being plotted on the ordinate. It is found that the tumour inhibiting protein fractions are combined in this instance in the collective fraction V, as well as in collective fraction IV.

The desired tumour inhibiting fraction may be used as it is or after having been further purified. The resulting highly purified protein fraction may be stored in the lyophilized form; it is, however, advantageous to dialyze it against water to free it from inorganic constituents, especially buffer salts, before it is lyophilized.

The protein fractions obtained according to the procedure of the invention from the above-mentioned starting materials by carrier-free deflection electrophoresis are primarily the protein fractions, designated as Nx A Y and Nx 1 A Y, which are obtained from the protein fractions Nx and Nx 1 resulting from the salting-out procedure and subsequent dialysis, and the proteins, designated as Nx $11_{0-0.4}$ A Y and Nx $12_{0-0.4}$ A Y, for example Nx$_{0.1}$ A Y or Nx $11_{0.35}$ A Y, especially Nx $12_{0.1}$ A Y or Nx$12_{0.35}$ A Y, which are obtained from the proteins Nx $11_{0-0.4}$ and Nx $12_{0-0.4}$ resulting from the salting-in procedure, or mixtures of such protein fractions or proteins thereof; Y designates the tumour inhibiting collective fraction identified by Roman numerals. They may be used as medicaments for treating cancerous diseases, if desired, after additional purification operations. They may be used, for example, in the form of pharmaceutical preparations containing them in conjunction or admixture with organic or inorganic pharmaceutical excipients, which are especially suitable for parenteral administration. The pharmaceutical preparations may, for example, take the form of dry ampoules. They may be sterilized and/or contain auxiliaries, such as preserving, stabilizing, wetting or emulsifying agents, salts for regulating the osmotic pressure or buffers. They may also contain further therepeutically valuable substances.

The following examples illustrate the invention.

EXAMPLE 1

The dialysis retentate designated as Nx 1 in Example 1, section 3 of my application No. 355,429, filed Mar. 27, 1964, is salted-in as described in section 4 of the above-mentioned Example 1 with the aid of an 0.03 molar aqueous 2-amino-2-hydroxymethyl-1,3-propanediol buffer. The centrifuged solution is adjusted to the substance concentration of 1% by addition of the same buffer solution. 20 millilitres of this solution, containing 0.2 g. of substance that can be compared with one of the protein fractions designated by Nx 12 in my application No. 355,429, filed Mar. 27, 1964, Now U.S. Patent 3,394,120 are supplied at a rate of 1 ml./hour at a distance of 12.5 cm. from the cathode to the 0.5 mm. thick buffer film of the deflection electrophoresis apparatus (Hannig, Z. Anal. Chem., Vol. 181, page 244 [1961]), travelling in a width of 50 cm. across the electric field. The buffer current flows at a speed of 80 ml./hour, corresponding to a migration speed of the buffer front of about 30 cm./hour. The electric field is kept constant at 1,900 v., and the current intensity is of the order of 180 ma. When 20 ml. of the substance solution have been consumed, more of it can be poured in and the separation may be continued for as long as is desired.

The buffer front issuing from the bottom end of the separating apparatus is collected in 48 contiguous fractions; these are classified by measuring their ultraviolet absorptions at 280 m$\mu$ (2 hours after starting the electrophoresis, that is to say when the substance begins to run out) and continually combined to collective fractions (FIGURE 1).

The fractions thus obtained may be salted out, for example, by addition of aqueous ammonium sulphate up to a molarity of 3 and centrifuged off as a precipitate and, if desired, liquefied, dialyzed and then cautiously lyophilized; alternatively, they may be used as they result from the deflection electrophoresis.

As is shown by the electrophoreses subsequently performed with the fractions 3–7 (collective fraction I), 8–9 (collective fraction II), 10–18 (collective fraction III), 19–24 (collective fraction IV), 25–30 (collective fraction V) and 31–38 (collective fraction VI) on acetylcellulose strips and evaluated in the Analytrol apparatus of Messrs. Beckmann, the tumour inhibiting component is present in the collective fraction V (FIGURE 2) formed from the individual fractions 25 to 30, that is to say protein fraction Nx 12 A V having a maximum in fraction 27, as well as in the collective fraction IV from the single fractions 19–24, i.e. protein fraction Nx 12 A IV (FIGURE 1).

EXAMPLE 2

Figure 3:
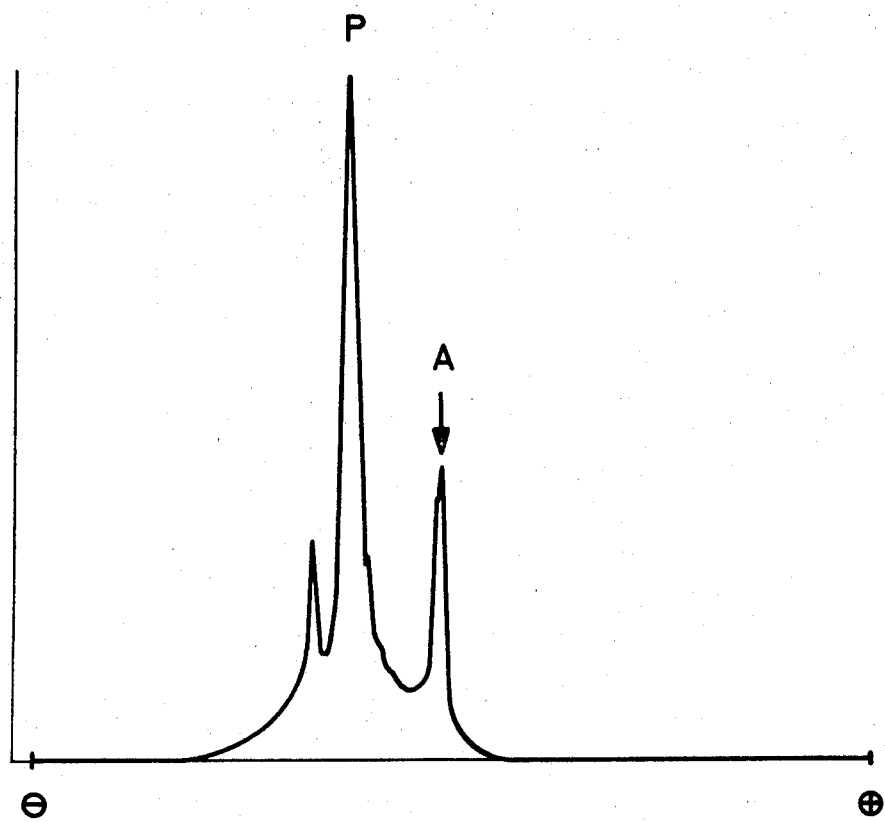
Figure 4:
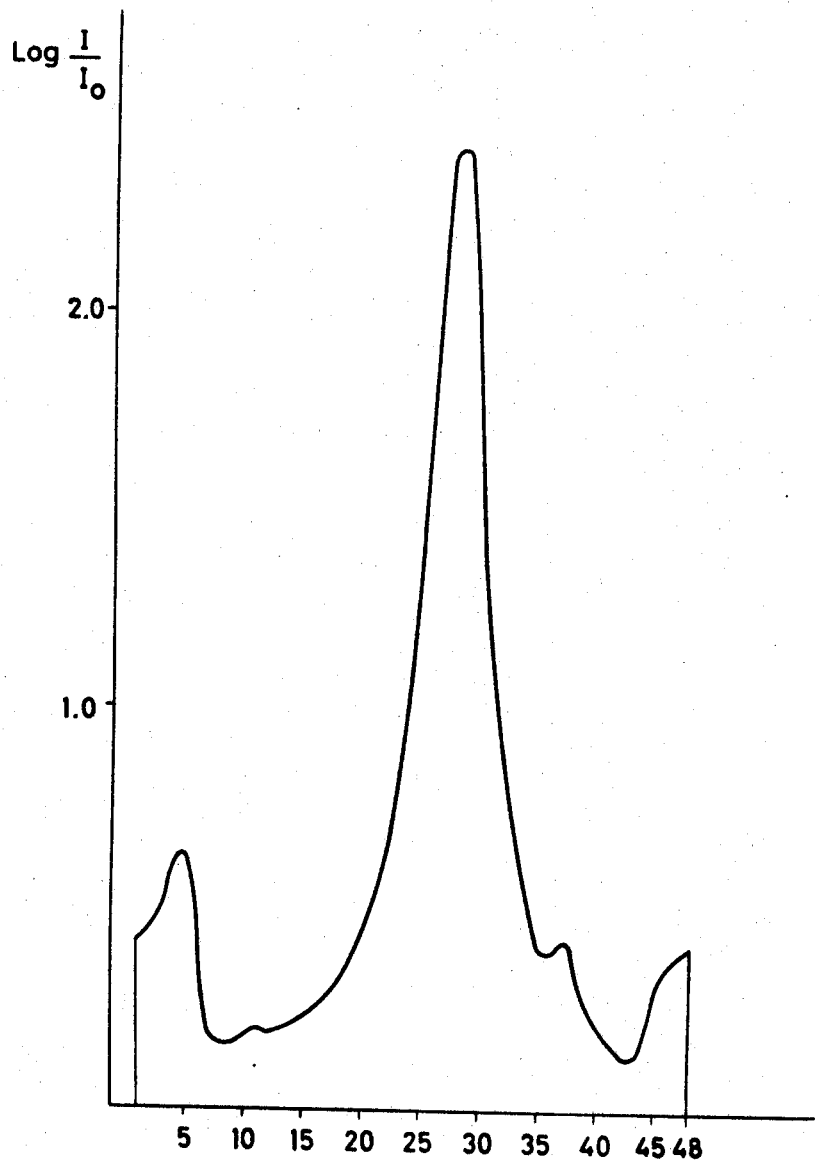
Figure 5:
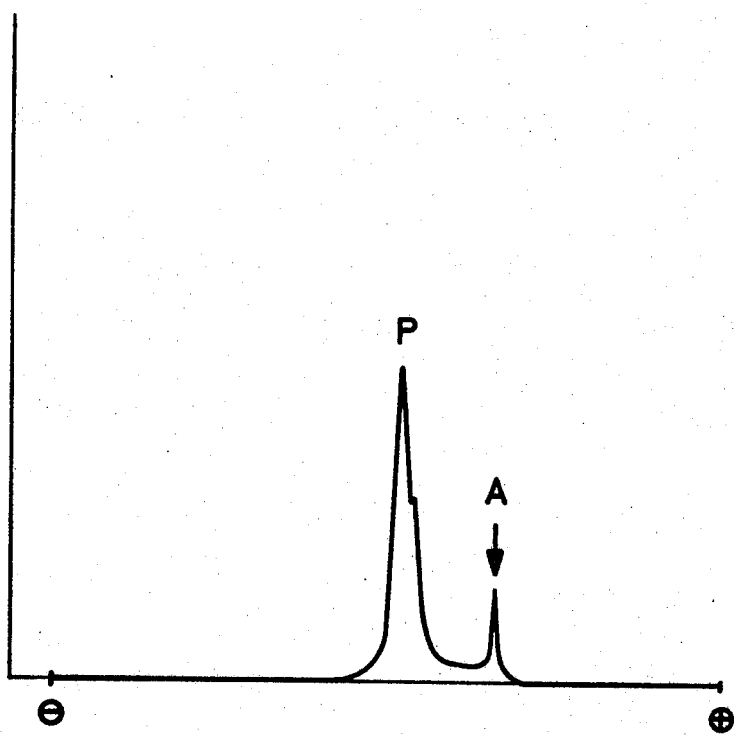

For comparison, a carrier-free deflection electrophoresis similar to that described in Example 1 is carried out with the extensively purified protein fraction obtained in Example 1 or 6 of my application No. 355,429, filed Mar. 27, 1964, and designated as Nx 12 I (either Nx $12_{0.35}$I or Nx $12_{0.1}$I); its composition is established by acetylcellulose foil electrophoresis and evaluated in the Analytrol apparatus (FIGURE 3; A=point of application; P=position of the biologically active protein components; ordinate: extinction). As was to be expected, the bulk of the substance applied is especially enriched in the fractions 25–30 (FIGURE 4) which are collected and as collective fraction V subjected to an electrophoresis on acetylcellulose strips; their composition is shown in FIGURE 5 and evaluted with the Analytrol apparatus (A=point of application; P=biologically active protein component). The curve which as far as the active component is concerned, coincides substantially with FIGURE 3; thus, the tumour inhibiting protein components are primarily enriched in fractions 25–30 (collective fraction V) resulting from the carrier-free deflection electrophoresis. The collective fraction V is designated as Nx 12 I A V.

EXAMPLE 3

(a) A protein solution (176 ml.) in a 0.1 molar aqueous ammonium sulfate, containing 3 g. of a protein fraction, which can be compared with the proteinous substance Nx 12 (of my application No. 355,429, filed March 27, 1964) i.e. an about 1.7% solution, is filtered at +2° through a polydextrane gel (DEAE Sephadex A 50) block (diameter: 65 mm.; height: 120 mm.); the block is prepared by charging the gel with the help of an 0.1 molar aqueous sodium acetate solution, adjusted to a pH of 5.5. The total eluate is treated in the cold and while stirring with solid ammonium sulfate to a molarity of 3 (on the basis of ammonium sulfate) and allowed to stand during 30 hours at +2° C. The salted-out protein fraction is centrifuged off, dialyzed against water and lyophilized.

Figure 6:
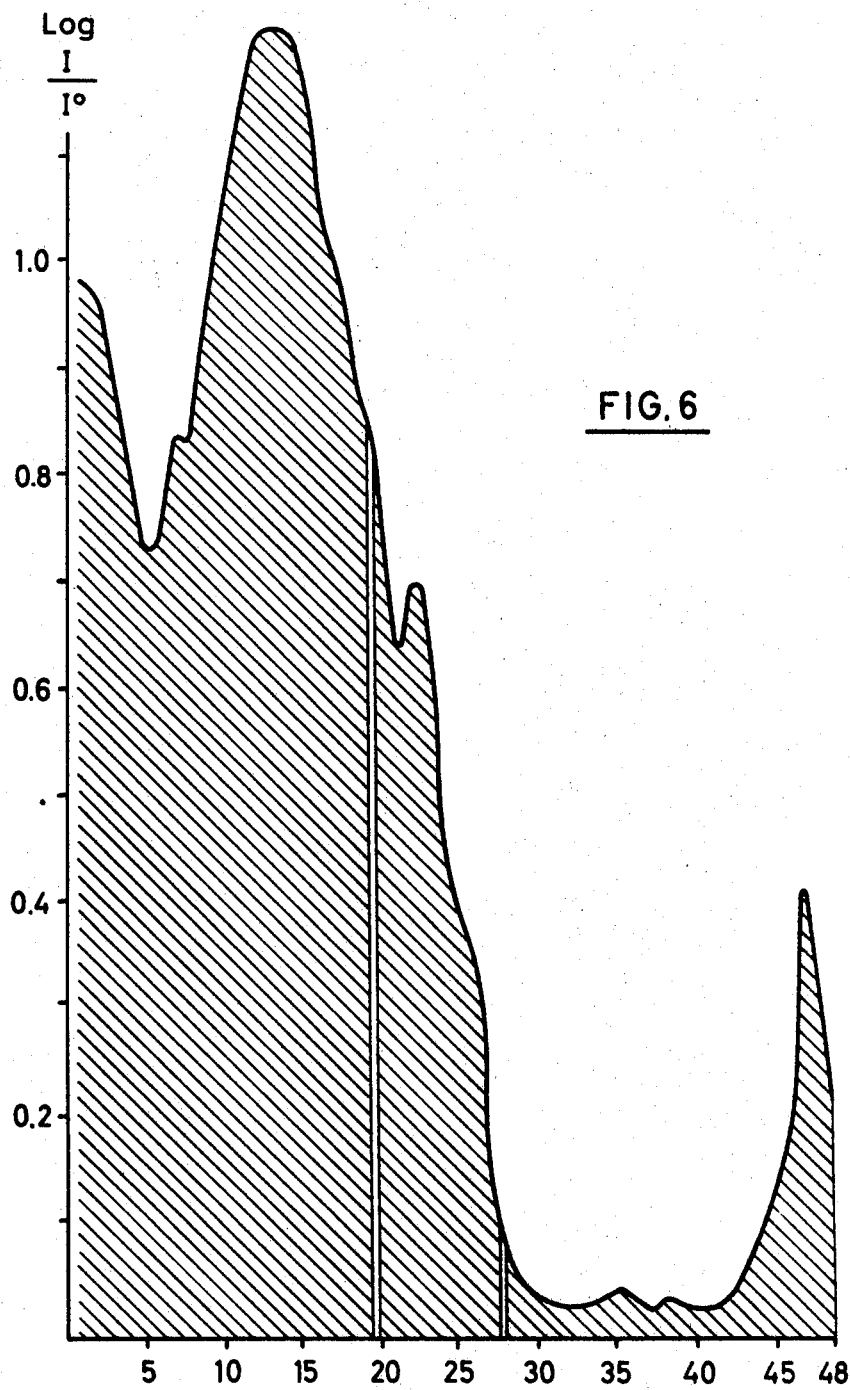

(b) A comparable starting material is obtained by dialyzing during 36 hours and at +2°, 20 ml. of the above protein solution containing the protein fraction corresponding to the substance designated as Nx 12, against a 0.05 molar aqueous 2-amino-2-hydroxymethyl-1,3-propanediol buffer, adjusted to pH 5.5 with citric acid. As described in Example 1, the solution is used in the carrier-free deflection electrophoresis. In view of the shift towards the anode due to the more acidic pH, the substance is added in the middle between the anode and the cathode; the addition rate is 2 ml./hour; the buffer moves at 120 ml./hour. The electric field is kept at 1,500 v., the current density is 240 ma., and the temperature is between +5° and +9°. In this pre-purification step, the brown-coloured and UV-absorbing ballast substances are primarily removed (FIGURE 6) and discarded as fractions 1–19. The protein material enriched in fractions 20–27 is combined, dialyzed and lyophilized; it can be compared with the material obtained in the previous block-filtration step.

Figure 7:
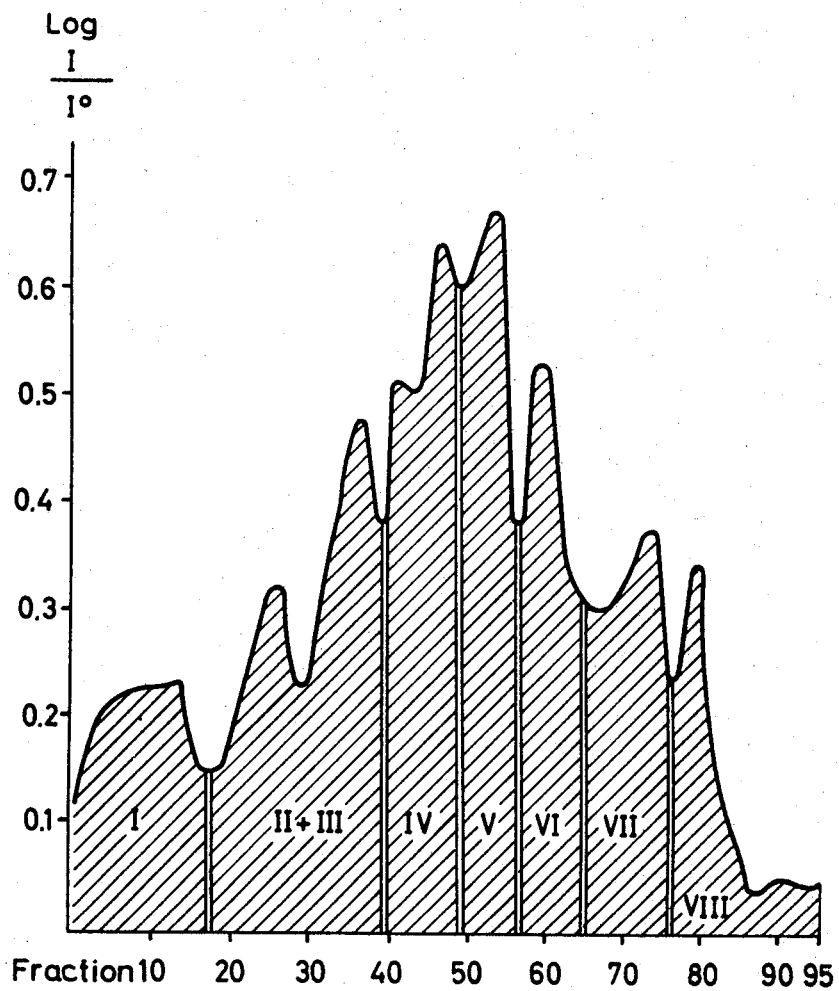
Figure 8:
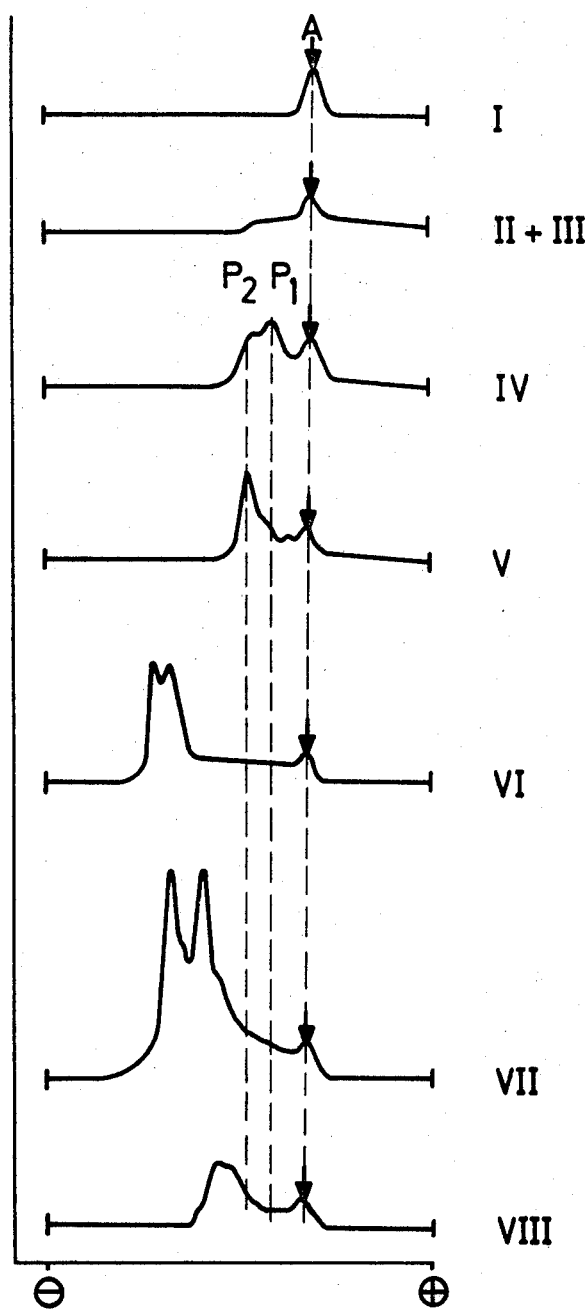

A solution of 0.04 g. of the pre-purified protein fraction prepared according to (a) or (b) in 2 ml. of chamber buffer (0.03 molar aqueous 2-amino-2-hydroxymethyl-1,3-propanediol, adjusted to 8.6 with citric acid) is added 12.5 cm. from the side of the cathode to the electrophoresis chamber; in this experiment one uses the vertical version of the VaP apparatus described by Hannig, loc. cit., which separates the buffer front at the end of the chamber into 95 fractions. The rate of addition of the substance is 2 ml./hour and the buffer travels with 80 ml./hour; the electric field is held at 2,400 v., the current intensity is about 110 ma. and the temperature is at +4°. After completed elution, the UV-absorbtion at 280 m$\mu$ of the single fractions is measured, and on the basis of the ultraviolet absorption diagram (FIGURE 7), the single fractions are combined into collective fractions, which are immediately dialyzed and lyophilized. The evaluation of the acetylcellulose foils electrophoreses in the "Analytrol" apparatus shows an almost complete separation of the components (FIGURE 8); the highly active components $P_1$ and $P_2$ are present in collective fraction IV (fractions 40–48) and collective fraction V (fractions 49–56); collective fractions I (fractions 1–17), II+III (fractions 18–39), VI (fractions 57–64), VII (fractions 65–75) and VII (fractions 76–95) contain ballast material and atypically toxic impurities.

What is claimed is:

1. In the process of manufacturing highly active tumor-inhibiting proteins free from ballast material and atypically toxic impurities from a member selected from the group consisting of press juice of mistletoe and purified tumour-inhibiting fractions obtained therefrom, the step which comprises subjecting a member selected from the group consisting of press juice of mistletoe and purified tumour-inhibiting fractions obtained therefrom to carrier-free deflection electrophoresis and isolating the tumour-inhibiting fraction, wherein the electrophoresis is carried out at a temperature of up to about plus 10° C.

2. Process according to claim 1, wherein a member selected from the group consisting of press juice from plant materials selected from the group consisting of Viscum and Loranthus species, and water-extracts, dialysates and purified protein fractions therefrom is used.

3. Process according to claim 2, wherein purified protein fractions obtained from the clear press juice by salting-out to a molarity of 1 to 1.9, calculated on the basis of ammonium sulfate, and dialysis retentates thereof are used.

4. Process according to claim 3, wherein purified protein fractions obtained from the dialysis retentates by salting-in up to a molarity of 0.4, calculated on the basis of ammonium sulfate, are used.

5. Process according to claim 1, wherein a solution of the starting material with a concentration from about 0.1% to about 5% in a non-denaturating aqueous buffer solution with an about 0.01 molar to about 0.1 molar concentration, adjusted to a pH of about 4 to about 10.5, is used.

6. Process according to claim 1, wherein a non-denaturating aqueous buffer solution with an about 0.01 molar to about 0.1 molar concentration, adjusted to a pH of about 4 to about 10.5, is used as the chamber buffer.

7. Process according to claim 1, wherein the electrophoresis is carried out using an about 0.03 molar aqueous 2-amino-2-hydroxymethyl-1,3-propanediol buffer, adjusted with citric acid to pH 8.6.

8. Process according to claim 1, wherein the starting material is applied at the side which is closer to the cathode.

9. Process according to claim 1, wherein a constant electric field of about 1,200 v. to about 2,500 v. is maintained and the current density is about 120 ma. to about 380 ma.

10. Process according to claim 1, wherein the electrophoresis is carried out at temperatures of about 0° to about +10°.

References Cited

UNITED STATES PATENTS 3,394,120  7/1968  Vester _____ 260—112

FOREIGN PATENTS 646,095  4/1964  Belgium.

OTHER REFERENCES

The Proteins, Neurath, vol. III, pp. 31–56, May 1965.
The Proteins, Neurath, vol. I, pp. 104–106, 1963.
Alexander, The Separation and Isolation of Proteins, 1960, vol. I, pp. 195–202, 221–229, 232, 237–238 and 241–244.

WILLIAM H. SHORT, Primary Examiner

H. SCHAIN, Assistant Examiner

U.S. Cl. X.R.

424—177, 195